(12) United States Patent
Huotari

(10) Patent No.: US 10,598,496 B2
(45) Date of Patent: Mar. 24, 2020

(54) LOCAL NAVIGATION SYSTEM

(71) Applicant: KONE Corporation, Helsinki (FI)

(72) Inventor: Tommi Huotari, Helsinki (FI)

(73) Assignee: KONE CORPORATION, Helsinki (FI)

( * ) Notice: Subject to any disclaimer, the term of this patent is extended or adjusted under 35 U.S.C. 154(b) by 330 days.

(21) Appl. No.: 15/492,419

(22) Filed: Apr. 20, 2017

(65) Prior Publication Data

US 2017/0219352 A1    Aug. 3, 2017

Related U.S. Application Data

(63) Continuation of application No. PCT/EP2014/075690, filed on Nov. 26, 2014.

(51) Int. Cl.
*G01C 21/20* (2006.01)
*G01S 1/68* (2006.01)
*H04W 88/02* (2009.01)

(52) U.S. Cl.
CPC ............ *G01C 21/20* (2013.01); *G01S 1/68* (2013.01); *G01S 1/685* (2013.01); *H04W 88/02* (2013.01)

(58) Field of Classification Search
None
See application file for complete search history.

(56) References Cited

U.S. PATENT DOCUMENTS 5,952,626 A * 9/1999 Zaharia .................. B66B 1/468
  187/381
8,085,768 B1 * 12/2011 Hui ........................ H04L 45/18
  370/389

(Continued)

FOREIGN PATENT DOCUMENTS

EP      2 131 148 A1    12/2009

*Primary Examiner* — Nicholas K Wiltey
(74) *Attorney, Agent, or Firm* — Birch, Stewart, Kolasch & Birch, LLP

(57) ABSTRACT

A local navigation system includes: a plurality of beacons located in a local environment and being configured to send signals specified to different routes in said local environment; a plurality of mobile devices, each of them including a client controller; and a wireless communication link configured to receive the signals sent by the beacons; an output means configured to display/emit navigation guide data. In the local navigation system, the client controller is configured to process the signals received via the wireless communication link and to process this data into navigation guide data outputted on an output of the mobile device. Each route included in the local environment is assigned a unitary ID and each beacon is located in one specific location of the local environment along at least one of said routes. Each beacon is configured to send the IDs of all the routes passing along its specific location. The client controller obtains the route ID to a chosen destination from a destination input device of the local navigation system and/or of the mobile device. The client controller is configured to provide the navigation guide data in interaction with the beacons sending said route IDs of the chosen location. This system allows anonymous navigation in the local environment, possibly in a decentralized system without centralized or wired system components.

17 Claims, 2 Drawing Sheets

(56) References Cited

U.S. PATENT DOCUMENTS

Figure 1:
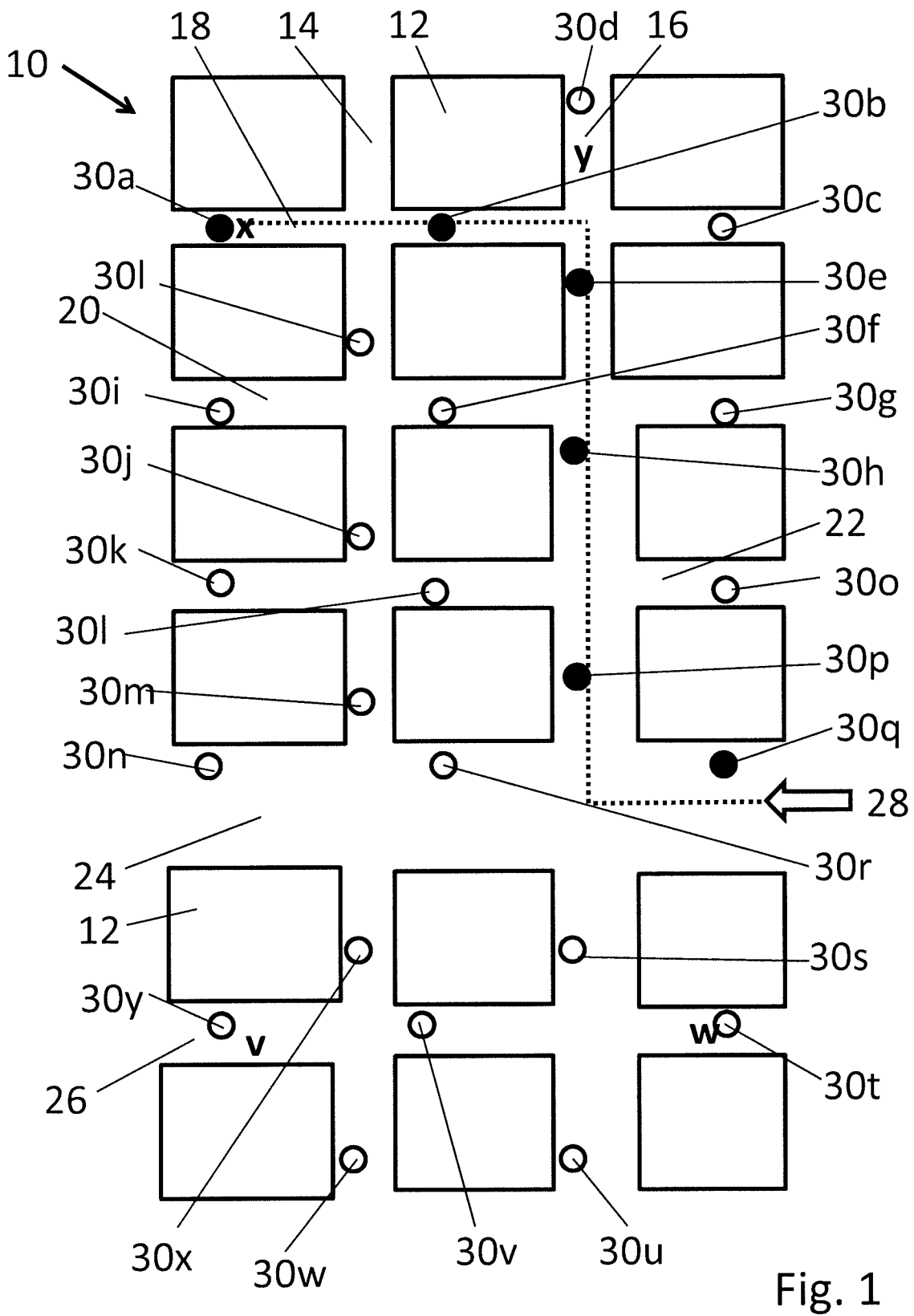

| | | | | |
|---|---|---|---|---|
| 8,412,183 | B1* | 4/2013 | Kadous | G01C 21/206 455/423 |
| 9,204,251 | B1* | 12/2015 | Mendelson | G08G 1/14 |
| 9,420,423 | B1* | 8/2016 | Mendelson | H04W 4/90 |
| 10,451,423 | B1* | 10/2019 | Clausen | G01C 21/005 |
| 2005/0136845 | A1* | 6/2005 | Masuoka | G01S 5/0294 455/67.14 |
| 2006/0136173 | A1* | 6/2006 | Case, Jr. | A63B 24/00 702/182 |
| 2008/0153515 | A1* | 6/2008 | Mock | G01C 21/20 455/456.5 |
| 2008/0159244 | A1* | 7/2008 | Hunziker | H04Q 9/00 370/338 |
| 2009/0322566 | A1* | 12/2009 | Shirakawa | G01C 21/20 340/944 |
| 2010/0309845 | A1* | 12/2010 | Jeon | H04W 72/04 370/328 |
| 2011/0282901 | A1* | 11/2011 | Marks | G01S 5/0236 707/769 |
| 2012/0036467 | A1* | 2/2012 | Tom | G06Q 10/047 715/772 |
| 2012/0095675 | A1* | 4/2012 | Tom | G01C 21/343 701/425 |
| 2012/0140629 | A1* | 6/2012 | Jeon | H04L 45/302 370/235 |
| 2012/0310517 | A1* | 12/2012 | van den Oever | G08G 1/0965 701/300 |
| 2013/0053066 | A1* | 2/2013 | Khorashadi | H04W 4/021 455/456.2 |
| 2013/0124085 | A1* | 5/2013 | Mochizuki | G01C 21/3415 701/466 |
| 2014/0156186 | A1* | 6/2014 | Liu | G01C 21/206 701/533 |
| 2014/0163867 | A1* | 6/2014 | Fernandez | G01C 21/206 701/425 |
| 2014/0231184 | A1* | 8/2014 | Kappeler | B66B 1/468 187/380 |
| 2014/0236474 | A1* | 8/2014 | Hansen | G01C 21/206 701/408 |
| 2014/0343846 | A1* | 11/2014 | Goldman | G05D 1/0272 701/525 |
| 2015/0119087 | A1* | 4/2015 | Lee | H04W 4/027 455/457 |
| 2015/0330787 | A1* | 11/2015 | Cioffi | G06Q 30/0261 701/537 |
| 2016/0044467 | A1* | 2/2016 | Clausen | H04W 4/021 455/457 |
| 2016/0054130 | A1* | 2/2016 | Marimuthu | G01C 21/206 701/408 |
| 2016/0063609 | A1* | 3/2016 | Argue | G06Q 30/0639 705/16 |
| 2016/0123755 | A1* | 5/2016 | Gambera | B60W 50/0097 701/70 |
| 2016/0165136 | A1* | 6/2016 | Mitsui | H04N 21/4524 348/36 |
| 2016/0189132 | A1* | 6/2016 | Cash | G06Q 20/3224 705/14.57 |
| 2016/0192140 | A1* | 6/2016 | Park | H04W 4/023 455/456.3 |
| 2016/0212684 | A1* | 7/2016 | Li | H04W 4/38 |
| 2016/0259027 | A1* | 9/2016 | Said | H04W 4/33 |
| 2016/0292978 | A1* | 10/2016 | Lee | H04W 4/06 |
| 2016/0295376 | A1* | 10/2016 | Geng | H04W 4/33 |
| 2016/0346611 | A1* | 12/2016 | Rowley | A43B 3/0005 |
| 2017/0013409 | A1* | 1/2017 | Cerchio | G01C 25/005 |
| 2017/0013658 | A1* | 1/2017 | Ta | H04W 4/06 |
| 2017/0068959 | A1* | 3/2017 | Kwak | G06Q 20/34 |
| 2017/0171719 | A1* | 6/2017 | Igarashi | H04W 4/043 |
| 2017/0206559 | A1* | 7/2017 | Bakshi | G06Q 30/0261 |
| 2017/0262790 | A1* | 9/2017 | Khasis | G01C 21/3415 |
| 2017/0345296 | A1* | 11/2017 | Dukish | G08G 1/09 |
| 2018/0296427 | A1* | 10/2018 | Troesch | G09B 21/006 |
| 2018/0308063 | A1* | 10/2018 | Jan | G06Q 10/1091 |
| 2019/0017832 | A1* | 1/2019 | Busser | G06Q 50/30 |
| 2019/0072395 | A1* | 3/2019 | Namboodiri | G01C 21/206 |
| 2019/0234743 | A1* | 8/2019 | Roy | H04W 4/20 |

\* cited by examiner

LOCAL NAVIGATION SYSTEM

CROSS REFERENCE TO RELATED APPLICATIONS

This application is a Continuation of PCT International Application No. PCT/EP2014/075690, filed on Nov. 26, 2014, which is hereby expressly incorporated by reference into the present application.

The present invention relates to a local navigation system, particularly for use or for local environments as for example buildings, shopping malls, airports or fair locations, particularly locations where GSM data or GPS signals or other wireless navigation methods are difficult to receive, mostly indoor applications.

For facilitating indoor navigation, beacons have been used in connection with a centralized passenger transport and/or navigation system which leads the user through the local environments, often in connection with the ride in a device of said passenger transport system. The disadvantage of these known solutions is that on one hand, each user is registered in the centralized system of the local environment so that he does not travel anonymous through the local environment.

Another problem is the wiring that is necessary to connect the different beacons in the local environment with a central system.

It is therefore object of the present invention to provide a local navigation system for a local environment wherein the user is guided anonymously.

This object is solved with a local navigation system according to claim 1. Advantageous embodiments of the invention are subject-matter of the dependent claims. Advantageous embodiments of the invention are also described in the description and drawings. The inventive content may also consist of several separate inventions, especially if the invention is considered in the light of expressions or implicit subtasks or from the point of advantages achieved. In this case, some of the attributes contained in the claims below may be superfluous from the view point of separate inventive concepts.

According to the invention, the local navigation system comprises a plurality of beacons located in a local environment and being configured to send signals specified to different routes in said local environment; a plurality of mobile devices each of them comprising a client control means, a wireless communication link configured to receive the signals sent by the beacons and an output means, e.g. display or loudspeaker, configured to output/display navigation guide data established by the client control means. In said local navigation system, the client control means is configured to process the signals received via the wireless communication link and to process this data into navigation guide data played on an output means of the mobile device, e.g the display or the loudspeaker. Each route in the local environment is assigned a unitary ID. Further, each beacon is configured to be located in one specific location of the local environment along at least one of said routes whereby each beacon is configured to send the ID of at least one of the routes passing along its specific location.

In a preferred de-centralized arrangement, each beacon is configured to send the IDs of all routes passing along its specific location. Such a preferred de-centralized solution does not need essential wiring and central structures in the local environment In order to use the navigation system the user of the local navigation system enters a destination into an input device of the local navigation system which could for example be a destination operating panel of the local navigation system and/or passenger transport system of the local environment and/or a destination list displayed on the display of the mobile device based on an application launched on the mobile device. Via this application the client control means displays a list of the available destinations in the local environment after having contacted at least once a data source for the available destinations in the local environment, e.g. via internet.

When the user inputs the destination in a destination operating panel of a local passenger transport system, the destination data has to be transferred to the mobile device, e.g. via a wireless short range transmission link, e.b. infrared, Bluetooth® or ultra-sound. In any case the input of the destination in the local navigation system leads to the input of the chosen destination into the mobile device.

After the user has chosen his destination, the client control means correlates a route ID with the chosen destination. Now the client control means is configured to provide said navigation guide data, e.g. via display or loudspeaker of the mobile device in interaction with the beacons sending said route ID of the chosen location. The use of a loudspeaker to provide the navigation guide data for the user also enables the guide of handicapped people through the local environment.

Via this means, the beacons can be provided as standalone units not needing any con nection to a centralized part of the navigation system or to a common power supply so that an afterwards installation of such a navigation system is easy, e.g. during modernization of a local environment.

In one embodiment of the invention the client control means is able via the signals transmitted by the beacons along the route to give a navigation guide to the user, e.g. to give the direction of the further route and/or to indicate the current position of the user on a graphically displayed route. For example, the beacons can be located at a crossing on corridor walls or ceilings going to the right, to the left and heading straight ahead so that the client control means gets the direction of the further travel from the location of the beacon sending the route ID of the chosen destination. Of course, it is also possible that the beacon also sends guide data correlated to a route ID so that each route ID signal is accompanied by a joined guide message as for example right, left, straight ahead, elevator up, elevator down, etc. Via this additional guide data sent by the beacon, the client control means is able to obtain the direction of the travel independent of the location of a beacon at a crossing.

Preferably, in a decentralized solution, each beacon sends all route IDs of the routes passing the specific location of the beacon. This solution has the advantage that no central control of the beacons is necessary but they all run on their own. The required data for the client control means to obtain the destinations and routes available at the local environment can be provided either by a centralized destination control system or passenger transport system of the local environment or via other even external sources, for example a server connected to a local area network, particularly internet. Accordingly, a local navigation system can be established in a local environment without needing any central administrative or control units in the local environment.

Preferably, each beacon is configured as a stand-alone unit comprising its own power supply. This means that for the installation of a beacon along at least one route in the local environment, no kind of wiring is necessary for the installation. Preferably, the power supply is an accumulator which can be preferably exchanged after a certain time by service operators. It is even possible to enable each beacon to send a status signal of its power supply so that service operators can walk along the routes and check the status of each beacon as to replace weak accumulators.

The beacon can be a unit which is able to send data, it could also be a RFID device with a sufficient range which does not need an own power supply. Of course, the beacons can also be realized as transmitters which can send but also receive data from the mobile devices, e.g. confirmation of the signal use during navigation.

Preferably, the beacons are configured to send along with the route ID a beacon ID which could be processed by the client control means of the mobile device to indicate the user's position on the route in the displayed navigation guide data. Via this means, the user knows which part of the route he has already passed and which part is lying before him. This data can also be used by the client control means to provide absolute route length, e.g. the lengths of the route portions being passed and lying ahead of the user.

As the beacon is preferably a stand-alone unit, the beacon has preferably a memory for the IDs of the routes passing said specific location of the beacons. These IDs could for example be stored in an EPROM of the beacon before it is located at its specific location in the local environment. If additionally to the route IDs, also the beacon ID or guide data is to be transmitted, then the memory preferably also provides portions for these other data types.

In a preferred embodiment of the invention, the client control means comprises a list of the destinations available in the local environment and a list of corresponding routes to said destinations, whereby the client control means is configured to display at least a part of said route leading to a chosen destination in interaction with the signals sent by the beacons, i.e. the route IDs or the route IDs combined with the beacon ID and/or additional guide data. The signals of the beacons for the route to a chosen destination, is preferably processed by the client control means to indicate the current location of the user on said route which facilitates the navigation for the user particularly in a wide-spread local environment as e.g. an airport.

The signals, i.e. the route ID, beacon ID and eventually guide data, is transmitted preferably in form of infrared signals or broadcast signals, particularly Bluetooth®. The signals should cover only a short range of possibly not more than 5 to 15 m.

In one centralized embodiment of the invention, the local navigation system comprises a centralized navigation system control means located in the local environment comprising a destination control system which handles the destinations and corresponding routes in said local environment. This destination control system is for example able to coordinate the navigation of the user in the local environment in line with the use of different kinds of passenger transport systems and passenger conveyor systems in the local environment as e.g. elevators and escalators.

Preferably, in such a centralized system, a control communication link is provided between the navigation system control means and the beacons whereby the destination control system obtains destinations chosen by users of the local environment, preferably via destination operating panels of the passenger transport system and whereby the navigation system control means is configured to activate only those beacons to send a route ID which are located on a route to a chosen destination, i.e. to a destination which has been chosen by a user of the local environment. Via this means, the transmission of data by beacons in the local environment can be reduced to a minimum which reduces the complete level of signal transmission in the local environment. This topic could be essential in health care locations as for example in hospitals and rehab institutions. Furthermore, each beacon has an essentially reduced task of sending multiple route IDs which is advantageous for the duty cycle of an internal power supply of the beacon.

In a preferred embodiment of the invention, the local navigation system comprises a data exchange link between the destination control means of the navigation system control means at the local environment and the client control means of the mobile device, particularly a local area network, particularly internet. Via this data exchange link, the mobile device is able to get the available destinations in the local environment eventually together with the route IDs and possibly other processing data which could be installed as an App on the mobile device.

In the above invention it is clear that the beacons located in a more central part of the local environment, for example in a central hallway, send much more route IDs than the beacons which are nearer to the destinations in different parts of the local environment. For example, if a beacon is in a central passage, it is possible that it sends 100 route IDs e.g. in a cycle of 5 seconds. This means that each second the beacon sends 20 route IDs which is no problem with respect to the technical realization of the beacon.

In a preferred embodiment of the invention, at least a part of said beacons, particularly the beacons at the destination points of the local environment, are bidirectional transmitters and are configured to sense the arrival of a mobile device at the chosen destination point. Via this means, the navigation system knows when the user has reached the chosen destination point so that the activated beacons can again be switched off (in a centralized solution).

Preferably, in this case, the activated beacons are configured to stop sending the corresponding route IDs after a preset time if no arrival of the mobile device at the chosen destination point is detected. By this means it is ensured that the beacons do not continue sending the route ID of a chosen destination if the user meanwhile has stopped the navigation and is not further pursuing his way to his chosen destination.

The above-mentioned embodiments of the invention can be combined with each other as long as this is technically feasible. Furthermore, single components of the invention can be provided as a single component or as a multiple component according to the requirements of the specific local environments.

Figure 2:
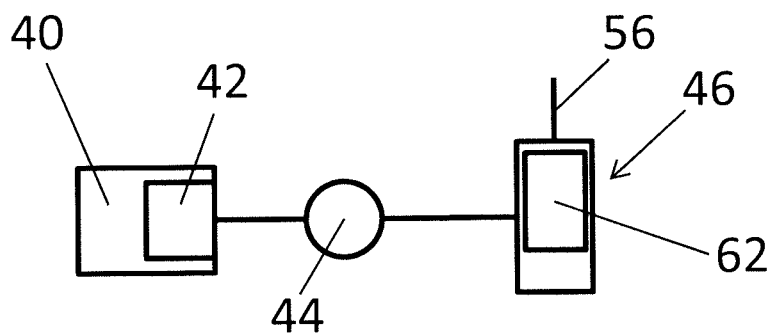
Figure 3:
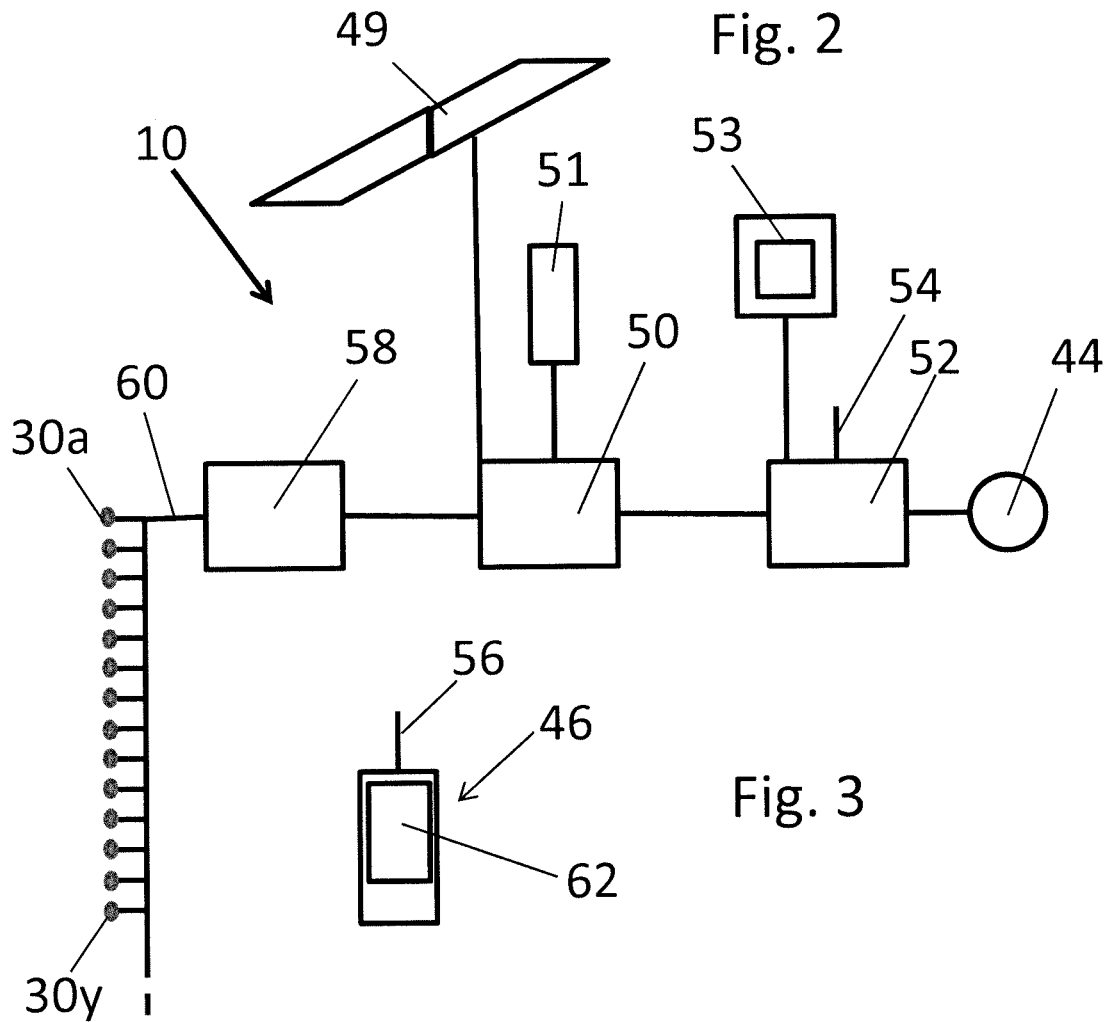

The invention is now described by means of an embodiment in the schematic drawings. In these drawings:

FIG. 1 shows a f a local environment with beacons located in the corridors of said local environment, FIG. 2 a schematic diagram showing the data transmission of destination and route data to a client control means of a mobile device via internet, and FIG. 3 a centralized local navigation system where the beacons are connected to a navigation system control means located in the local environment.

FIG. 1 shows a local environment, i.e. a shopping mall 10 comprising a number of locations, particularly stores 12 and corridors 14, 16, 18, 20, 22, 24, 26 in between these stores. The local environment 10 also has an entrance 28 on the right side in the drawing. Spread all over the local environment 10, e.g. a shopping mall, are beacons 30*a*-30*y*. Each of said beacons 30*a*-30*y* transmits the route IDs of all routes passing the specific location where the respective beacon is located in the local environment 10. Let assume a user wants to get from the entrance 28 to the location x in the vicinity of the beacon 30*a*, then the route ID of said destination x may be also x. Now all beacons located on the route to the destination x are sending the route ID "x", which beacons are beginning from the entrance 28 to the destination x the beacon 30*q*, 30*p*, 30*h*, 30*e*, 30*b*, 30*a*. These six beacons send the route ID x so that a user which is entering the local environment 10 at the entrance 28 can be guided via his mobile device from the entrance 28 to the destination x. Hereby, the client control means which has obtained the destination and/or the route ID in the local environment 10 either from an input in the mobile device or from a destination operating panel of a navigation system or transport system in the local environment is able to discriminate the received signals from the beacons to only consider those beacons which send the route ID "x". Via the arrangement of the corresponding beacons 30*q*, 30*p*, 30*h*, 30*e*, 30*b*, 30*a* along the route to the destination x, the mobile device is easily able to track the route to the destination which facilitates for the user any kind of indoor navigation.

Of course, the beacons in the main corridor 24 send the most route IDs as each beacon has to send the IDs of all routes passing the specific location of the beacon in the local environment. Accordingly, the more centralized located beacons send a lot more IDs than the beacons which are more remote from central locations and which are more probably nearer to the destination. This can be easily shown in the drawing, which shows four further destinations v, w, y, z. In this case the beacon 30*q* sends the IDs "v", "w", "x" and "y". The beacons 30*p*, 30*h* and 30*e* send the IDs "x" and "y", the beacon 30*s* send the IDs "v" and "w", the beacons 30*v* and 30*y* send the ID "v", the beacon 30*t* sends the ID "w", the beacons 30*b* and 30*a* send the ID "x" and the beacon 30*d* sends the ID "y". Of course, the route ID of a destination may differ from the name of the destination. The ID may have any signal format which is readable by the data processing means.

In an alternative embodiment, all the beacons 30*a*-30*y* can also be connected to a centralized navigation system control means located in the local environment. When the user chooses a destination, for example in a destination operation panel of a passenger transport system, the navigation system control means can for example activate only those beacons which are leading to the chosen destination, i.e. in the embodiment of FIG. 1 for the destination x the beacons 30*q*, 30*p*, 30*h*, 30*e*, 30*b* and 30*a*. The disadvantage of this system is that a wire connection between the beacons and the central navigation system control means is necessary. But on the other hand, the overall transmission of the beacons is essentially reduced with respect to the system, where the beacons work as stand-alone units and send all the route IDs of the routes passing the specific location of the beacons.

FIG. 2 shows a very simple way of providing the client control means of the mobile device with destination or route data which enables the mobile device, particularly an application (App) launched at the mobile device, to perform the navigation in the local environment 10 with the aid of the beacons 30*a*-30*y*. The local environment 10 comprises a server 40 of the local navigation system which comprises a destination control system 42. This server 40 is connected to the internet 44 such that a mobile device 46 of the user is able to download an App for the navigation in the local environment as well as the available destinations provided in the local environment along with the correlated routes. Via this means, all the necessary application data and processing data necessary for the mobile device to perform navigation by the help of the beacons 30*a*-30*y* is obtained via the server 40 connected with the internet 44 so that this kind of technical solution of a local navigation system does not need any centralized components in the local environment.

A more sophisticated centralized solution is shown in FIG. 3. FIG. 3 shows a navigation system control means 50 which is also a control means of a local passenger transport system connected with a destination control system 52, connected with a destination operating panel (DOP) 53, which destination control system 52 optionally comprises further a wireless data exchange means 54, for example a broadcasting system, which interacts with a wireless data exchange means 56 of the mobile device 46. Furthermore, the destination control system 52 of the local navigation system can be optionally connected to the internet 44 to which the mobile device 46 can be connected. The navigation system control means 50 is further connected to an input/output interface 58 which is via a serial bus 60 connected to the beacons 30*a*-30*y* as shown in FIG. 1. The local navigation system is here correlated with a passenger transport system with passenger transport devices as escalators 49 and elevators 51 so that the passenger is guided through the local environment via the escalators and elevators, whereby beacons can be placed in connection with these passenger transport devices, e.g. in the elevator car.

The mobile device 46 comprises a touchscreen 62 via which the user is able to input a destination in the local environment 10 which has been displayed by an App launched on the mobile device 46 or which is obtained via the data exchange link 54 and 56 between the destination control system 52 and the mobile device 46. Via this wireless data exchange link 54, 56, the navigation system control means 50 activates via the input/output interface 58 the beacons 30*q*, 30*p*, 30*h*, 30*e*, 30*b*, 30*a* which are leading to a chosen destination x so that only these beacons are transmitting the route ID as navigation signal considered by the client control means of the mobile device 46.

This centralized navigation system enables an easy and unambiguous navigation of a user even in a very wide distributed local environment whereby the emitted transmission of all beacons is minimized which could be important in hospitals and rehab centers or in other healthcare locations. The invention is not delimited to the above-mentioned embodiments but can be varied within the scope of the appended patent claims.

The invention claimed is:

1. A local navigation system comprising:
   a plurality of beacons located in a local environment and being configured to send signals representing different routes in said local environment;
   a plurality of mobile devices, each comprising:
      a client control means,
      a wireless communication link configured to receive the signals sent by the beacons;
      an output means configured to display/emit navigation guide data;
   wherein the client control means is configured to process the signals received via the wireless communication link and to process the signals into navigation guide data outputted on output means of the mobile device,
   wherein:
   each route comprised in the local environment is assigned with a unitary route ID,
   each beacon is located in one specific location of the local environment along at least one of said routes, and is configured to send the route IDs of all the routes passing along said one specific location, and
   the client control means is configured to:

correlate one of the route IDs of all routes in the local environment to a chosen destination from a destination input device of the local navigation system and/or of the mobile device, discriminate received signals from the plurality of beacons to only consider those beacons whose sent signals include said route ID correlated to the chosen destination, and provide said navigation guide data in interaction with the only considered beacons, and wherein each beacon is configured as a stand-alone unit comprising its own power supply, and the navigation guide data is generated without a central control of the plurality of beacons.

2. The local navigation system according to claim 1, wherein the power supply is an accumulator.

3. The Local navigation system according to claim 2, wherein each beacon is configured to send a status signal of its power supply.

4. The local navigation system according to claim 2, wherein each beacon is configured to send a beacon ID additionally to the route ID, which beacon ID is processed to indicate a certain position of a user on the route to the chosen destination in the displayed navigation guide data.

5. The local navigation system according to claim 1, wherein each beacon is configured to send a status signal of its power supply.

6. The local navigation system according to claim 5, wherein each beacon is configured to send a beacon ID additionally to the route ID, which beacon ID is processed to indicate a certain position of a user on the route to the chosen destination in the displayed navigation guide data.

7. The local navigation system according to claim 1, wherein each beacon is configured to send a beacon ID additionally to the route ID, which beacon ID is processed to indicate a certain position of a user on the route to the chosen destination in the displayed navigation guide data.

8. The local navigation system according to claim 1, wherein the beacons are configured to send guide data correlated to each route ID, which guide data is processed in the mobile device to navigation guide data displayed on the mobile device's output means.

9. The local navigation system according to claim 1, wherein the client control means or a destination control system of the local environment comprises a list of the destinations available in the local environment and a list of corresponding routes to said destinations, and the client control means of the mobile device is configured to display as navigation guide data at least a part of said route leading to the chosen destination based on the signals obtained from the beacons, whereby the signal of the beacons for said route is processed by the client control means to indicate the current location of the user on said route.

10. The local navigation system according to claim 1, comprising a navigation system control means located in the local environment being connected with a destination control system which handles destination points to be chosen by users of the local environment and corresponding routes in said local environment.

11. The local navigation system according to claim 10, whereby a control communication link is provided between the navigation system control means and the beacons and wherein the navigation system control means is configured to activate only those beacons to send a route ID which are located on a route to the chosen destination point (x).

12. The local navigation system according to claim 11, wherein at least a part of said beacons are bidirectional transmitters and are configured to sense the arrival of one of the plurality of mobile devices at the chosen destination point and to transmit a signal regarding the arrival to the navigation system control means.

13. The local navigation system according to claim 11, wherein the activated beacons are configured to stop sending the corresponding route ID's after a preset time if no arrival of the mobile device at the chosen destination point is detected.

14. The local navigation system according to claim 1, comprising a data exchange link between the local navigation system and the client control means of the mobile device.

15. The local navigation system according to claim 14, wherein the data exchange link is a local area network.

16. The local navigation system according to claim 1, wherein each beacon has a memory for the IDs of the routes passing said specific location of the beacon.

17. The local navigation system according to claim 1, wherein the wireless communication link is based on infrared or Bluetooth.

* * * * *